(12) United States Patent
Mehedy et al.

(10) Patent No.: US 11,367,140 B2
(45) Date of Patent: Jun. 21, 2022

(54) DYNAMIC CYBER INSURANCE USING A DISTRIBUTED LEDGER

(71) Applicant: International Business Machines Corporation, Armonk, NY (US)

(72) Inventors: Lenin Mehedy, Doncaster East (AU); Mukesh Kumar Mohania, Waramanga (AU); Vugranam C. Sreedhar, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 16/729,914

(22) Filed: Dec. 30, 2019

(65) Prior Publication Data

US 2021/0201418 A1 Jul. 1, 2021

(51) Int. Cl.
*G06Q 40/08* (2012.01)
*H04L 9/40* (2022.01)

(52) U.S. Cl.
CPC ......... *G06Q 40/08* (2013.01); *H04L 63/1433* (2013.01)

(58) Field of Classification Search
CPC ................................ G06Q 40/08; H04L 29/06
See application file for complete search history.

(56) References Cited

U.S. PATENT DOCUMENTS

| | | | |
|---|---|---|---|
| 6,647,374 B2 * | 11/2003 | Kansal | G06Q 10/0639 705/37 |
| 9,935,968 B2 | 4/2018 | Pal et al. | |
| 2005/0261943 A1 | 11/2005 | Quarterman et al. | |
| 2014/0081671 A1 | 3/2014 | Schaad | |
| 2016/0359895 A1 * | 12/2016 | Chiu | H04L 63/1425 |
| 2017/0317881 A1 * | 11/2017 | Smartt | G06F 12/00 |
| 2018/0027001 A1 * | 1/2018 | Park | G06F 21/6245 726/23 |
| 2019/0052664 A1 * | 2/2019 | Kibler | H04L 63/1433 |
| 2020/0219197 A1 * | 7/2020 | Fields | B60W 30/0956 |

FOREIGN PATENT DOCUMENTS

| | | |
|---|---|---|
| WO | 2016064919 A1 | 4/2016 |
| WO | 2017174141 A1 | 10/2017 |

OTHER PUBLICATIONS

US 10,291,642 B2, 05/2019, Ng et al. (withdrawn)
Bohme et al., "Models and Measures for Correlation in Cyber-Insurance." WEIS. 2006.

(Continued)

*Primary Examiner* — Scott S Trotter
(74) *Attorney, Agent, or Firm* — Patterson + Sheridan, LLP (57) ABSTRACT

Techniques for secure electronic collaboration among parties to provide dynamic cyber insurance are disclosed. A profile describing information technology (IT) infrastructure for an entity is retrieved from an electronic distributed ledger. At least a portion of the profile is provided to a risk evaluator using the electronic distributed ledger. A cyber security risk evaluation associated with the profile is retrieved from the electronic distributed ledger. A request for cyber insurance from the entity is received. Cyber insurance parameters for the entity are determined automatically, using a computer processor, and based on the cyber security risk evaluation. The entity acquires cyber insurance based on the determined cyber insurance parameters.

16 Claims, 7 Drawing Sheets

(56) References Cited

OTHER PUBLICATIONS

Gordon et al., . "A framework for using insurance for cyber-risk management." Communications of the ACM 46.3 (2003): 81-85.
Kevin DiGrazia, "Cyber Insurance, Data Security, and Blockchain in the Wake of the Equifax Breach," Journal of Business & Technology Law, vol. 13, Issue 2, 24 pages, 2018.
Gabriela Ciocarlie, Karim Eldefrawy, and Tancr'ede Lepoint, "BlockCIS—A Blockchain-based Cyber Insurance System," https://cwe.mitre.org/cwss/cwss v1.0.1.html;accessed Jan. 7, 2018, 8 pages.

\* cited by examiner

DYNAMIC CYBER INSURANCE USING A DISTRIBUTED LEDGER

BACKGROUND

Disclosed embodiments relate to collaboration among parties in a computer network, and more specifically, to collaboration among parties to provide dynamic cyber insurance.

Cyber insurance can provide entities with protection against a variety of information technology concerns, including data leaks and breaches and malicious interactions with an entity's systems. It can be very difficult, however, for insurers to accurately assess risk in order to provide cyber insurance. Currently, many cyber insurance providers gather information using basic questionnaires, leaving any actual forensic investigation of an insured's systems to be conducted at the claim processing phase. This is because there is no effective way to calculate the risk and premiums for cyber insurance. Further, the lack of accurate risk assessment can mean that an insurer cannot distinguish a low-risk entity (e.g., an entity with strong information technology protections) from a high-risk entity (e.g., an entity with potential vulnerabilities). This can discourage information technology service companies from upgrading and maintaining their systems, since insurance rates may not accurately reflect these upgrades and maintenance. Further, information technology infrastructure evolves rapidly with the needs of customers and market growth, which may render obsolete, or violate, a cyber insurance product's terms and conditions.

SUMMARY

Embodiments include a computer-implemented method. The method includes retrieving from an electronic distributed ledger a profile describing information technology (IT) infrastructure for an entity. The method further includes providing at least a portion of the profile to a risk evaluator using the electronic distributed ledger. The method further includes retrieving from the electronic distributed ledger a cyber security risk evaluation associated with the profile. The method further includes receiving from the entity a request for cyber insurance. The method further includes automatically determining cyber insurance parameters for the entity, using a computer processor, and based on the cyber security risk evaluation. The entity acquires cyber insurance based on the determined cyber insurance parameters.

Embodiments further include a system. The system includes a processor and a memory containing a program that, when executed on the processor, performs an operation. The operation includes retrieving from an electronic distributed ledger a profile describing information technology (IT) infrastructure for an entity. The operation further includes providing at least a portion of the profile to a risk evaluator using the electronic distributed ledger. The operation further includes retrieving from the electronic distributed ledger a cyber security risk evaluation associated with the profile. The operation further includes receiving from the entity a request for cyber insurance. The operation further includes automatically determining cyber insurance parameters for the entity, based on the cyber security risk evaluation. The entity acquires cyber insurance based on the determined cyber insurance parameters.

Embodiments further include a non-transitory computer program product including a computer-readable storage medium having computer-readable program code embodied therewith, the computer-readable program code executable by one or more computer processors to perform an operation. The operation includes retrieving from an electronic distributed ledger a profile describing information technology (IT) infrastructure for an entity. The operation further includes providing at least a portion of the profile to a risk evaluator using the electronic distributed ledger. The operation further includes retrieving from the electronic distributed ledger a cyber security risk evaluation associated with the profile. The operation further includes receiving from the entity a request for cyber insurance. The operation further includes automatically determining cyber insurance parameters for the entity, based on the cyber security risk evaluation. The entity acquires cyber insurance based on the determined cyber insurance parameters.

DETAILED DESCRIPTION

Embodiments disclosed herein relate to facilitating trusted electronic collaboration among parties to provide dynamic cyber insurance. For example, a consortium of insurance providers, software vendors, hardware vendors, and compliance testers can be formed. These parties can collaborate to more effectively determine and identify risk for providing cyber insurance to a given entity. This both provides for more accurate premiums and encourages entities seeking insurance to maintain their information technology (IT) infrastructure, in order to procure lower insurance premiums.

Further, the parties to the consortium can pro-actively support insured entities to both improve cyber security and identify when risk associated with the entity has changed. For example, software and hardware vendors can release update plans for various software and hardware security improvements. In an embodiment, the dynamic consortium system can use this information to identify which insured entities require updates, and can develop a plan (e.g., deadlines) for the required updates. To maintain their current premiums (or to remain insured at all), insured entities can be required to meet the plan. This encourages entities to maintain their IT infrastructure, and assists insurers in maintaining an accurate risk assessment.

In an embodiment, the dynamic consortium system can use blockchain, or another distributed ledger technology, for timestamped record keeping among multiple parties in a trusted manner. This can ensure that arms-length parties (e.g., insurer and insured) can verify information exchanged among the consortium. Further, insurers or other parties to the consortium may use software agents on a customer premises to monitor that the advised measures (e.g., software and hardware security updates) have been applied.

Figure 1:
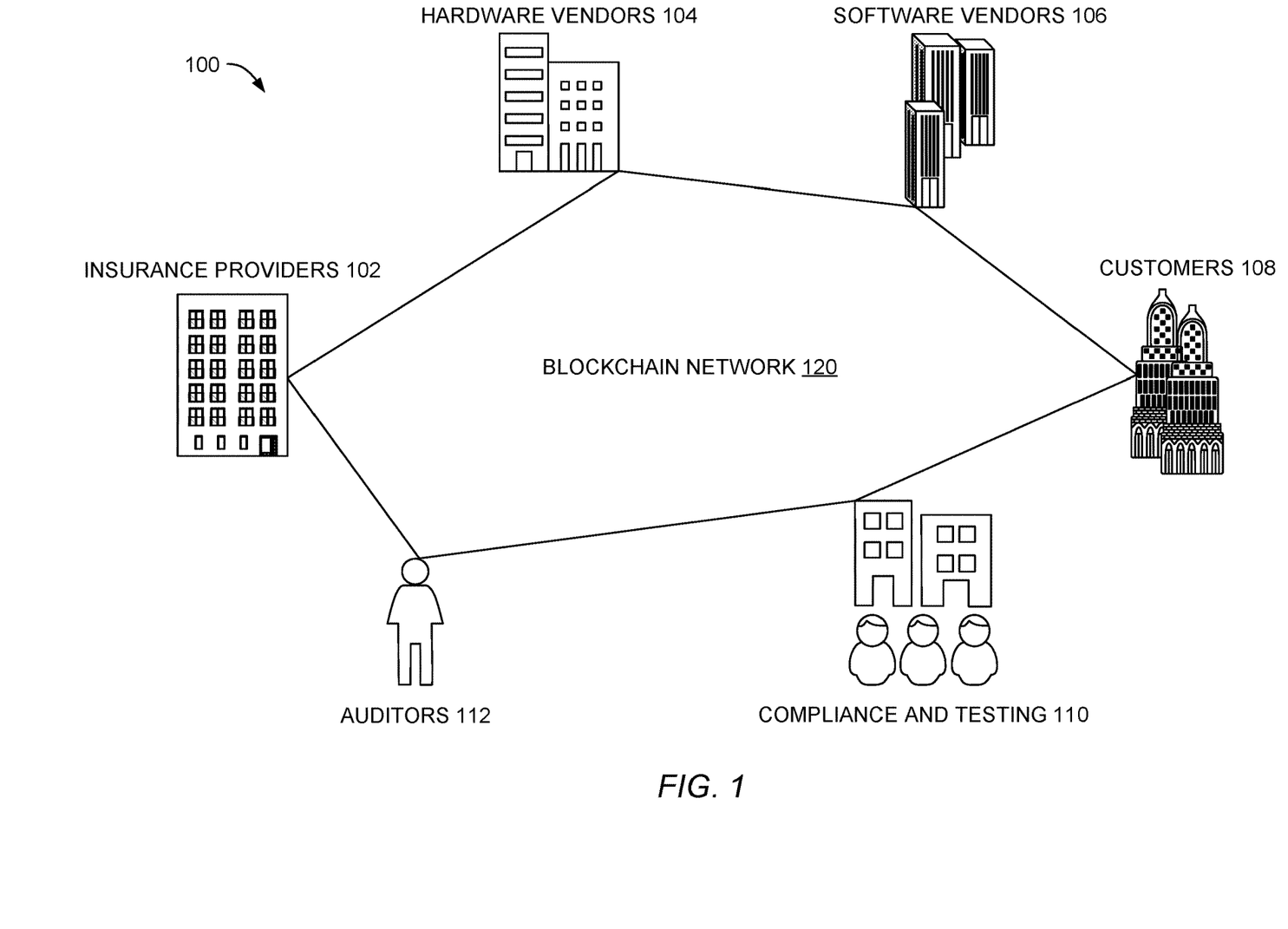
FIG. 1 illustrates an electronic cyber insurance consortium, according to one embodiment.

FIG. 1 illustrates an electronic cyber insurance consortium 100, according to one embodiment. Providing cyber insurance can involve many different parties. For example, a customer 108 (e.g., a corporate entity that is exposed to data security or cyber security risk) might be seeking cyber insurance from one or more insurance providers 102. In prior solutions, the insurance provider 102 might provide a questionnaire to the customer 108, requesting information about the customer's systems and IT infrastructure. The insurance provider 102 would then use that questionnaire to attempt to determine risk associated with the customer 108, in order to properly price premiums and provide insurance. Auditors 112 could check the initial, and ongoing, accuracy of the questionnaire responses from the customer 108, but this is time consuming, expensive, and prone to inaccuracies.

In an embodiment, an electronic consortium 100 can be formed using a blockchain network 120. As discussed further below, blockchain is merely one example of a suitable distributed ledger solution to implement the electronic consortium 100, and other technologies could also be used. In an embodiment, the blockchain network 120 provides for trusted collaboration among the customer 108 and the insurance provider 102, along with other parties: hardware vendors 104, software vendors 106, compliance and testing experts 110, and auditors 112. These are merely examples, and more, or fewer, parties could participate in the electronic consortium 100.

For example, customers may implement Infrastructure as Code (IaC), which can describe the customer's IT infrastructure using machine readable definition files. This can include CloudFormation files (e.g., AWS CloudFormation files), Terraform files (e.g., HashiCorp Terraform files), or other machine readable definition files. Alternatively, the customer's IT infrastructure can be represented using configuration files, a link to repository identifying the IT infrastructure (e.g., a GitHub link), or in any other suitable manner. As discussed further below in relation to FIG. 4, this IaC or alternative infrastructure description can be used to generate a profile describing the customer's IT infrastructure. This profile can be anonymized (e.g., removing identifying information for the customer) and stored in the ledger of the blockchain network 120.

The compliance and testing experts 110 can then examine the anonymous profile in the ledger of the blockchain network 120, and provide a risk evaluation. This risk evaluation can also be stored in the ledger of the blockchain network 120. Because the blockchain network 120 provides a secure distributed ledger, the compliance and testing experts 110 can trust the veracity of the profile, and further parties can trust the veracity of the associated risk evaluation. For example, one or more insurance providers 102 can use the risk score stored in the ledger of the blockchain network 120 to identify potential risk, and to provide a quote to the customer 108 for cyber insurance. Further, in an embodiment, the profile and associated information can be stored in an encrypted format for further protection.

In an embodiment, an insurance provider 102 can provide short term (e.g., pay-as-you-go) cyber insurance for the customer 108. As a condition of maintaining the insurance, the customer 108 must maintain advised hardware and software updates for the customer's IT infrastructure. For example, a hardware vendor 104 can alert the consortium 100 of an advised hardware update using the blockchain network 120. The insurance provider 102 can require the customer 108 to perform the upgrade within a mandated period, and can verify that the upgrade has been completed using the blockchain network 120. Similarly, a software vendor 106 can alert the consortium 100 of an advised software update (e.g., a security patch) using the blockchain network 120. The insurance provider 102 can require the customer 108 to perform the update within a mandated period, and can verify that the upgrade has been completed using the blockchain network 120.

In an embodiment, the blockchain network 120 (or another suitable distributed ledger) can facilitate trusted collaboration among the consortium. The ledger can be used to store relevant data exchanged between the parties, including the customer IT infrastructure profile, requests between the parties, further details of the customer's IT infrastructure (e.g., repository links), risk assessments from multiple parties, computed risk for various systems (e.g., software risk, hardware risk, data risk, Quality of Service risk), etc. This provides for trusted exchange of information between the arms-length parties.

Alternatively, or in addition, a trusted entity could maintain and manage the consortium 100, without using blockchain or a distributed ledger. For example, insurers could collectively establish an oversight entity to facilitate collaboration, without requiring a distributed ledger. As another alternative, an insurance provider could maintain its own proprietary consortium, with or without using a distributed ledger.

Figure 2:
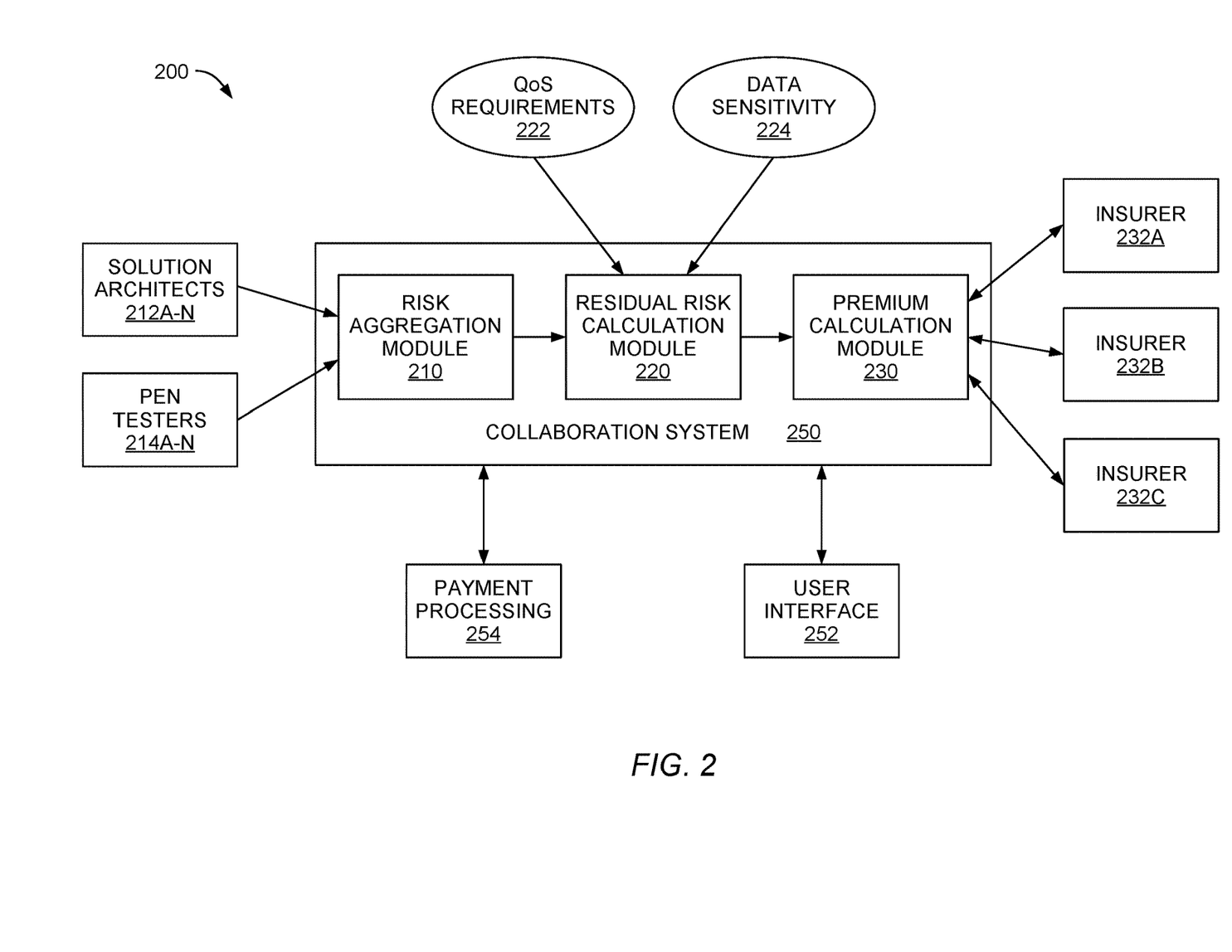
FIG. 2 illustrates a dynamic cyber insurance collaboration system, according to one embodiment.

FIG. 2 illustrates a dynamic cyber insurance collaboration system 200, according to one embodiment. As discussed further below with regard to FIG. 3, a collaboration system 250 includes a risk aggregation module 210, a residual risk calculation module 220, and a premium calculation module 230. One or more solution architects 212A-N and/or pen testers 214A-N (e.g., penetration testers) examine a customer's IT infrastructure and provide a risk assessment.

For example, as discussed above with regard to FIG. 2 and further below with regard to FIG. 4, a customer can provide IaC machine-readable definition of the customer's IT infrastructure. The one or more solution architects 212A-N and pen testers 214A-N can analyze this description and assess the risk of the IT infrastructure. In an embodiment, different solution architects and pen testers can focus on different aspects of the customer's system, and resulting assessments can be aggregated. For example, one solution architect 212A could analyze the customer's data security infrastructure, while another solution architect 212B could analyze the customer's intrusion protection infrastructure. Each of these assessments could be provided to the risk aggregation module 210.

In an embodiment the risk assessment from various evaluators (e.g., the system architects 212A-N and the pen testers 214A-N) are subjective. For example, these evaluators may work as independent contractors and may not be employees of entities in the consortium. Therefore, in an embodiment, the risk assessment from one individual tester is not accepted as the absolute measure of the risk of the infrastructure. Instead, or in addition, the risk aggregation module combines the assessments from multiple evaluators to estimate the risk (e.g. averaging, or weighted averaging where certain evaluators are given more weights) and then calculates the residual cyber security risk considering the data and service requirements of the customer. While reporting the risk, each evaluator can rate the IT infrastructure against various risk factors the system uses for its internal calculation. Each evaluator can have its own weight (e.g., provided by the system or an external authority) based on their certification/reputation or previous service. Such risk assessment from multiple evaluator can then be combined (e.g. weighted average) to estimate risk against various factors.

The risk aggregation module 210 can aggregate the various risk assessments and provide aggregated risk information to the residual risk calculation module 220. The residual risk calculation module 220 can use this data, along with additional factors, to calculate residual risk for the customer's IT infrastructure. In an embodiment, the residual risk calculation module 220 can consider Quality of Service (QoS) requirements 222 for the customer. For example, the customer may be obligated to provide a particular guaranteed QoS to its users. This could be provided as a QoS requirement 222. In an embodiment, the residual risk calculation module 220 can also consider the data sensitivity 224 for the customer. For example, a customer might maintain patient health data, sensitive financial information, or other data that is particularly sensitive. This information can be provided to the residual risk calculation module 220.

In an embodiment, total risk is a measure of risk that can be observed or perceived based on threats and vulnerabilities. Threats can be potential attacks based on known issues, while vulnerabilities also include unknown issues that could potentially be exploited. Total risk can be thought of as a product of threats and vulnerabilities. Total risk can be divided into controlled risk (e.g., risk that can be managed) and residual risk. Cyber insurance can be used to mitigate and offload residual risk for a customer. The residual risk calculation module 220 can take into account numerous factors when calculating residual risk, including the various aggregated risk assessments from the risk aggregation module, and other factors (e.g., the QoS requirements 222 and data sensitivity 224). In an embodiment residual risk can be calculated using a variety of known techniques, including Factor Analysis for Information Risk (FAIR) and others. In a pay as you go model, a dynamic premium is calculated based on estimated residual risk at that time.

In embodiment, the residual risk calculation module 220 provides the residual risk to a premium calculation module 230, which uses the residual risk to calculate a premium quote for a customer. The premium is one of several cyber insurance parameters that the premium calculation module 230 can calculate, along with policy duration, start date, limitations, etc. In an embodiment, different insurers 232A-C are likely to have their own proprietary techniques to calculate policy parameters based on the residual risk. As discussed further with regard to FIG. 7, below, the premium calculation module 230 can use a variety of techniques to ensure that the insurer's proprietary techniques remain confidential. For example, the residual risk could be provided to each insurer using an externally available Application Programming Interface function. The function could return the quoted parameters. Alternatively, or in addition, homomorphic encryption could be used, or a zero-knowledge proof could be used. As another alternative, a trusted execution environment (TEE) can be used, in which an isolated execution environment can execute encrypted code to implement the insurer's proprietary techniques, while maintaining security features to ensure that the techniques remain confidential.

In an embodiment, the collaboration system 250 provides the quoted parameters to the customer through a user interface 252. This can be any suitable user interface (e.g., a display screen, a messaging system, an audio alert, etc.). Further, payment processing 254 can be used to collect payment from a customer, both for the initial insurance and ongoing payments. In an embodiment, the customer payment is shared by the insurer and the other consortium entities (e.g., compliance and testing experts 110).

Figure 3:
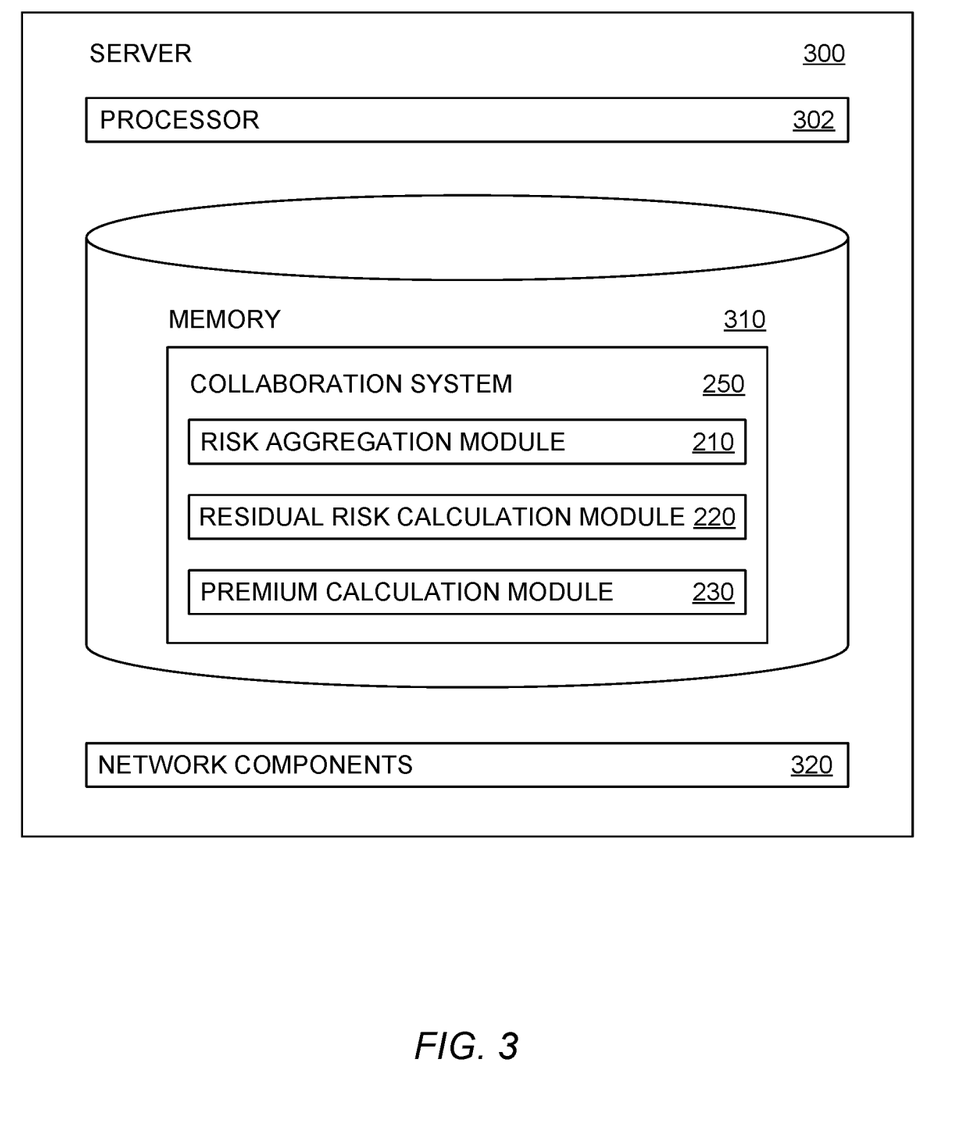
FIG. 3 is a block diagram illustrating a server implementing a dynamic cyber insurance consortium, according to one embodiment.

FIG. 3 is a block diagram illustrating a server 300 implementing a collaboration module, according to one embodiment. The server 300 includes a processor 302, a memory 310, and network components 320. The processor 302 generally retrieves and executes programming instructions stored in the memory 310. The processor 302 is included to be representative of a single central processing unit (CPU), multiple CPUs, a single CPU having multiple processing cores, graphics processing units (GPUs) having multiple execution paths, and the like. Further, the server 300 can be a single server computer, or can represent a collection of server computers (e.g., a distributed system).

The network components 320 include the components necessary for the server 300 to interface with a wireless or wired communication network (e.g., the blockchain network 120 illustrated in FIG. 1). For example, the network components 320 can include WiFi or cellular network interface components and associated software, or wired network interface components (e.g., Ethernet components, fiber optic components, etc.).

Although the memory 310 is shown as a single entity, the memory 310 may include one or more memory devices having blocks of memory associated with physical addresses, such as random access memory (RAM), read only memory (ROM), flash memory, or other types of volatile and/or non-volatile memory. The memory 310 generally includes program code for performing various functions related to use of the server 300. The program code is generally described as various functional "applications" or "modules" within the memory 210, although alternate implementations may have different functions and/or combinations of functions. Within the memory 310, the collaboration system 250 manages a dynamic cyber insurance collaboration system. The collaboration module includes a risk aggregation module 210, a residual risk calculation module 220, and a premium calculation module 230. These are discussed above in relation to FIG. 2 and further below in relation to the subsequent figures.

Figure 4:
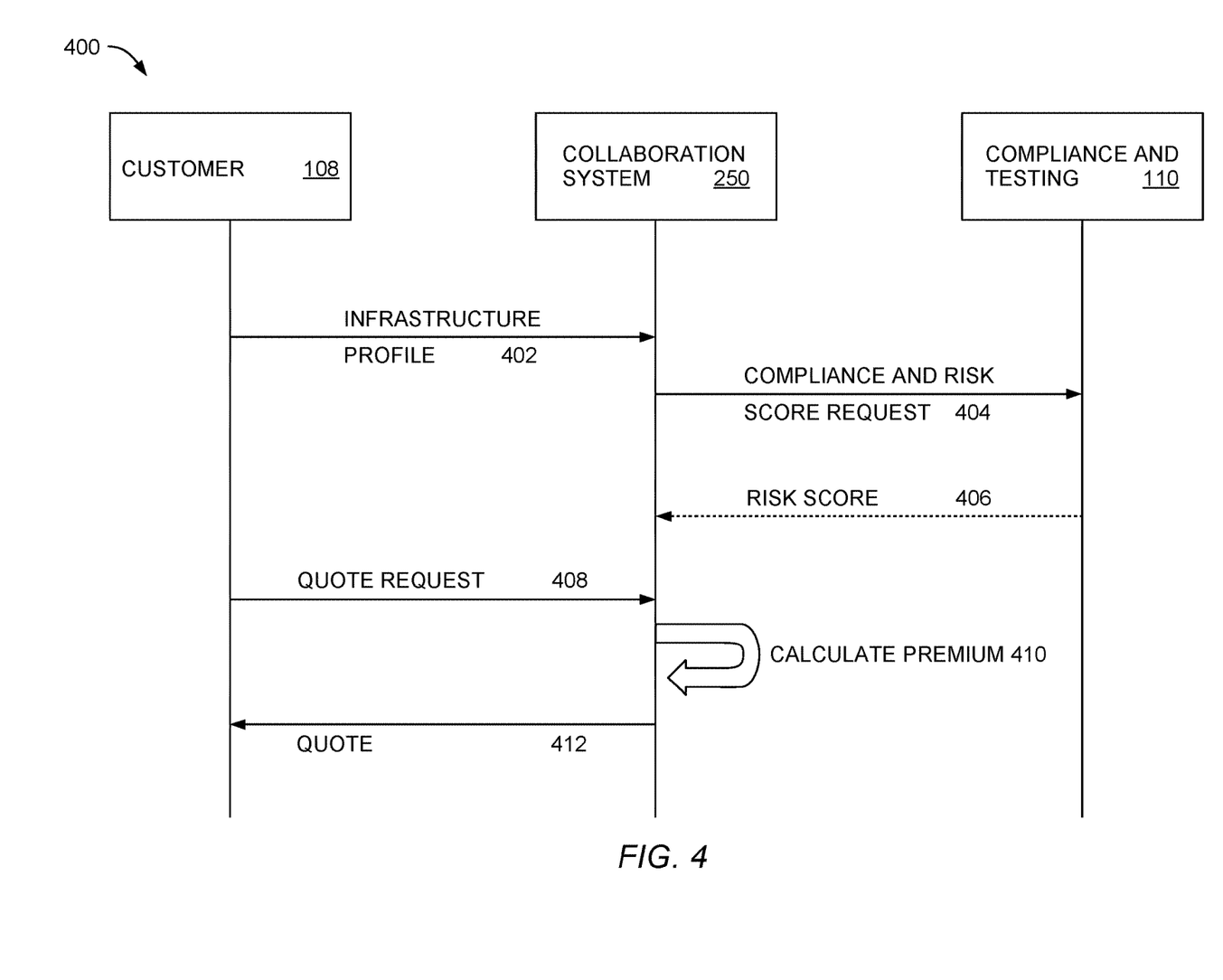
FIG. 4 is a flow diagram illustrating a request for dynamic cyber insurance, according to one embodiment.

FIG. 4 is a flow diagram 400 illustrating a request for dynamic cyber insurance, according to one embodiment. A customer 108 (e.g., an insurance customer, as illustrated in FIG. 1) transmits an infrastructure profile 402 to a collaboration system 250 (e.g., the collaboration system 250 illustrated in FIGS. 2-3). For example, as discussed above with regard to FIG. 1, the customer 108 may implement Infrastructure as Code (IaC), which can describe the customer's IT infrastructure using machine readable definition files. The customer 108 can provide the IaC definitions to the collaboration system 250, which can generate a profile describing the customers' IT infrastructure. In an embodiment, this profile is anonymized so that the customer 108 cannot be identified, and the profile is stored in a distributed ledger (e.g., using the blockchain network 120 illustrated in FIG. 1). IaC definitions are merely one example, and any suitable description of the customer's IT infrastructure can be used.

As discussed above, in one embodiment the customer 108 provides the IT infrastructure description (e.g., IaC definitions) to the collaboration system 250 and the collaboration system 250 generates a profile. Alternatively, the customer 108 can generate the profile (e.g., an anonymized profile) and provide it to the collaboration system 250. For example, if the customer is concerned about sharing details of the IT infrastructure to the collaboration system 250 in an identifiable format, the customer can ensure that the profile is anonymous before providing it to the collaboration system 250. As another alternative, the customer 108 can use another service (e.g., provided by a trusted third party) to generate the profile.

The collaboration system 250 then transmits a compliance and risk score request 404 to compliance and testing experts 110. In an embodiment, the compliance and risk score request includes the anonymized profile of the IT infrastructure of the customer 108. For example, as illustrated in FIG. 2, the solution architects 212A-N and/or the pen testers 214A-N can evaluate the profile (or portions of the profile) and can provide risk assessments to the collaboration system 250. These risk assessments include one or more risk scores 406. For example, the compliance and testing experts 110 can provide a single risk score 406 to the collaboration system 250, relating to the entire IT infrastructure of the customer 108. As another example, the compliance and testing experts 110 can provide multiple risk scores, each relating to a portion of the customer's IT infrastructure, and the collaboration system 250 can combine the risk assessments (e.g., using the risk aggregation module 210 illustrated in FIGS. 2-3).

The customer 108 then transmits a quote request 408 to the collaboration system 250. The collaboration system calculates the premium at step 410, using the risk. In an embodiment, the collaboration system 250 interacts with one or more insurers to calculate the premium based on the risk (e.g., using the residual risk calculation module 220 and the premium calculation module 230 illustrated in FIGS. 2-3). This is discussed further with regard to FIG. 7. The collaboration system 250 then transmits the quote 412 to the customer 108.

Figure 5:
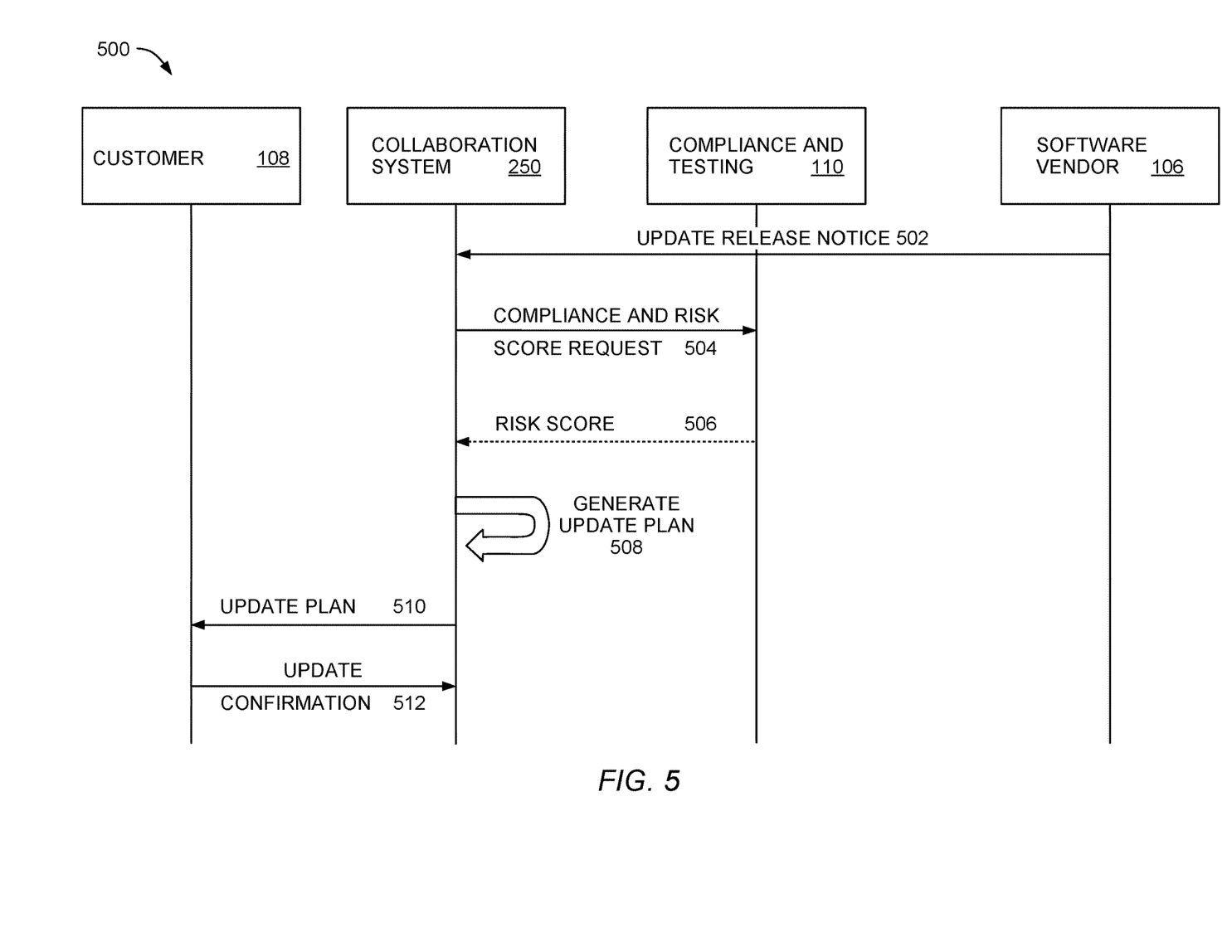
FIG. 5 is a flow diagram illustrating risk assessment and system monitoring for a dynamic cyber insurance consortium, according to one embodiment.

FIG. 5 is a flow diagram 500 illustrating risk assessment and system monitoring for a dynamic cyber insurance consortium, according to one embodiment. In an embodiment, assume that a customer 108 (e.g., an insurance customer, as illustrated in FIG. 1) has already procured short term (e.g., pay as you go) cyber insurance. A software vendor 106 (e.g., as illustrated in FIG. 1) releases a security update (e.g., a software patch) for software used by the customer 108. The software vendor provides an update release notice 502 to the collaboration system 250. For example, the software vendor 106 can write an entry to the ledger in the blockchain network 120 notifying the collaboration system 250 of the update. A software update is merely one example, and analogous techniques could be used for a hardware update (e.g., from a hardware vendor 104 as illustrated in FIG. 1).

The collaboration system 250 determines that the update is relevant to customer 108 (e.g., that the update relates to software or hardware used by the customer 108) and transmits a compliance and risk score request 504 to compliance and testing experts 110.

In an embodiment, the compliance and risk score request 504 includes the anonymized profile of the IT infrastructure of the customer 108. For example, as illustrated in FIG. 2, the solution architects 212A-N and/or the pen testers 214A-N can evaluate the profile (or portions of the profile) taking into account the update, and can determine the change in risk score based on the customer choosing to apply (or not apply) the update. The compliance and testing experts 110 can provide this updated risk score 506 to the collaboration system 250.

At step 508, the collaboration system 250 then generates an update plan for the customer 108. In an embodiment, the collaboration system 250 interacts with the insurer to determine the update plan. For example, the collaboration system 250 can provide the risk score 506 to the insurer, and the insurer can determine how quickly the customer 108 must upgrade and any consequences of failure to upgrade. For example, the insurer might determine that the customer 108 must apply the update within 1 week, or face an increase in premiums of a certain percentage. Further, the insurer might determine that longer term failure to apply the update (e.g., within 1 month) results in cancellation of the insurance policy. Alternatively, the insurer can empower the collaboration system to generate the update plan itself (e.g., by providing parameters for updates ahead of time). For example, an insurer could instruct the collaboration system 250 to require updates that have a level of influence on the customer's risk above a certain threshold to be implemented within a pre-determined window (e.g., 1 week).

The collaboration system 250 then transmits the update plan 510 to the customer 108. The customer 108 receives the plan and performs the update. The customer then transmits an update confirmation 512 to the collaboration system 250. In an embodiment, this confirmation is stored in the ledger of a blockchain network (e.g., the blockchain network 120 illustrated in FIG. 1) to provide assurance to the collaboration system that the customer 105 has actually performed the update. Further, the customer 108 could provide a new IT infrastructure profile reflecting the update (e.g., reflecting the new software or hardware version) and could store the new profile in the blockchain network.

Alternatively, or in addition, an insurer (or the collaboration system 250) could require a customer to install a local software agent on the customer's IT infrastructure. This software agent could continuously monitor and audit the customer's systems, ensuring that the systems match the insurer's requirements. Further, the agent could act to automatically install required updates, or to provide alerts to the customer's system administrators requesting updating.

Figure 6:
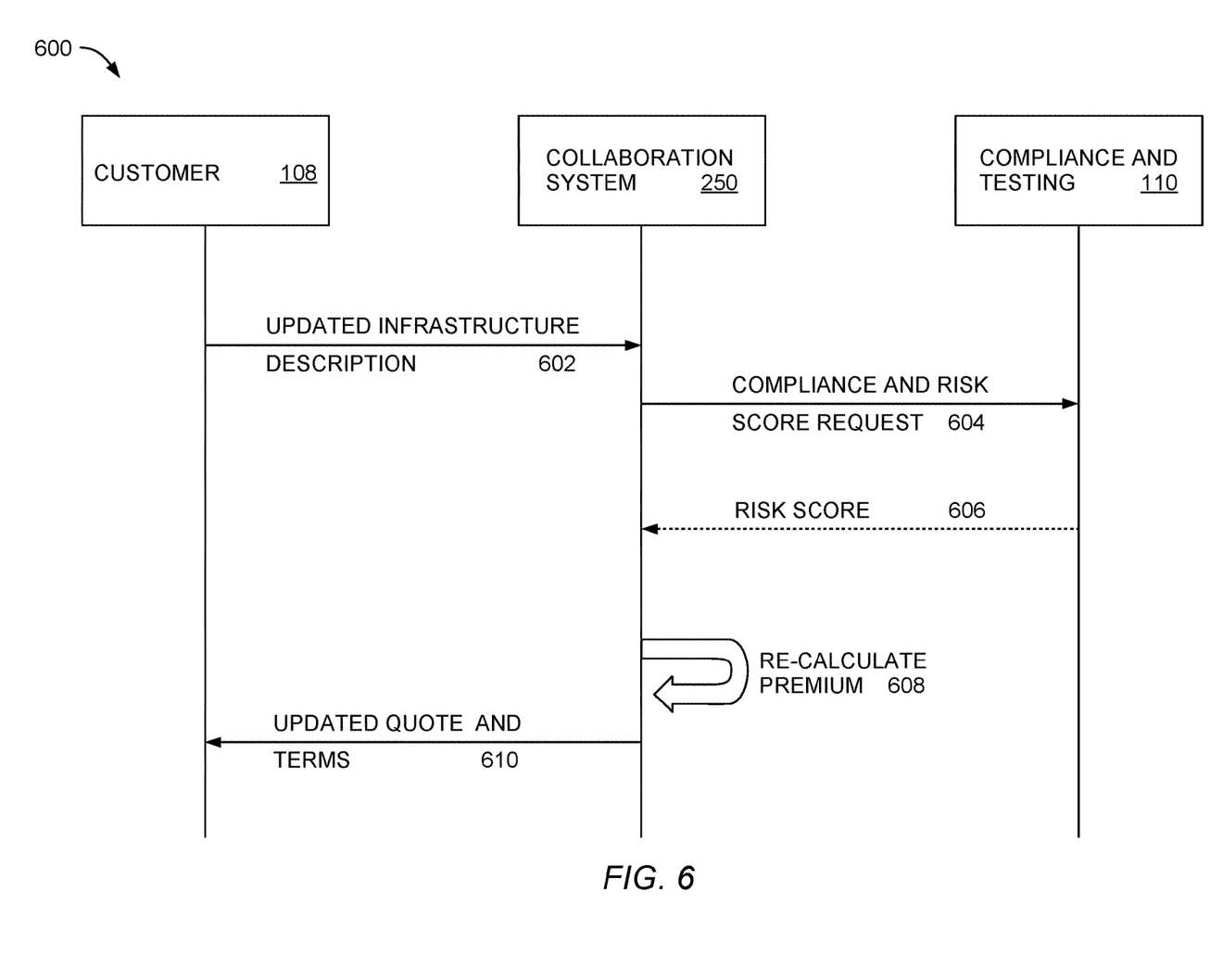
FIG. 6 is a flow diagram illustrating updated risk assessment for dynamic cyber insurance, according to one embodiment.

FIG. 6 is a flow diagram 600 illustrating updated risk assessment for dynamic cyber insurance, according to one embodiment. In an embodiment, assume that a customer 108 (e.g., an insurance customer, as illustrated in FIG. 1) has already procured short term (e.g., pay as you go) cyber insurance. The customer 108 has updated their IT infrastructure. The customer 108 provides an updated infrastructure description 602 to a collaboration system 250.

For example, as discussed above with regard to FIG. 1, the customer 108 may implement Infrastructure as Code (IaC), which can describe the customer's IT infrastructure using machine readable definition files. The customer 108 can provide the updated IaC definitions to the collaboration system 250, which can generate an updated profile describing the customers' IT infrastructure. In an embodiment, this profile remains anonymized so that the customer 108 cannot be identified, and the updated profile is stored in a distributed ledger (e.g., using the blockchain network 120 illustrated in FIG. 1). IaC definitions are merely one example, and any suitable description of the customer's updated IT infrastructure can be used.

As discussed above, in one embodiment the customer 108 provides the updated IT infrastructure description (e.g., IaC definitions) to the collaboration system 250 and the collaboration system 250 generates an updated profile. Alternatively, the customer 108 can generate the updated profile and provide it to the collaboration system 250. For example, if the customer is concerned about sharing details of the IT infrastructure to the collaboration system 250 in an identifiable format, the customer can ensure that the updated profile is anonymous before providing it to the collaboration system 250. As another alternative, the customer 108 can use another service (e.g., provided by a trusted third party) to generate the updated profile.

In an embodiment, the customer 108 chooses to provide an updated infrastructure description to the collaboration system. Alternatively, or in addition, the customer can have a local software agent installed in its IT infrastructure (e.g., as discussed above in connection with step 512 in FIG. 5). This local agent can automatically update the collaboration system of the updated IT infrastructure.

The collaboration system 250 then transmits a compliance and risk score request 604 to compliance and testing experts 110. In an embodiment, the compliance and risk score request includes the updated anonymized profile of the IT infrastructure of the customer 108. For example, as illustrated in FIG. 2, the solution architects 212A-N and/or the pen testers 214A-N can evaluate the updated profile (or portions of the updated profile) and can provide updated risk assessments to the collaboration system 250. These updated risk assessments include one or more risk scores 606. For example, the compliance and testing experts 110 can provide a single risk score 606 to the collaboration system 250, relating to the entire updated IT infrastructure of the customer 108. As another example, the compliance and testing experts 110 can provide multiple risk scores, each relating to a portion of the customer's updated IT infrastructure, and the collaboration system 250 can combine the risk assessments (e.g., using the risk aggregation module 210 illustrated in FIGS. 2-3).

The collaboration system 250 then re-calculates the premium at step 608, using the updated risk. In an embodiment, the collaboration system 250 interacts with one or more insurers to calculate the updated premium based on the risk (e.g., using the residual risk calculation module 220 and the premium calculation module 230 illustrated in FIGS. 2-3). This is discussed further with regard to FIG. 7. The collaboration system 250 then transmits the updated quote and terms 610 to the customer 108. In an embodiment, the updated quote and terms 610 provides an updated premium for the customer 108, if the customer wishes to continue its insurance using its updated IT infrastructure.

Figure 7:
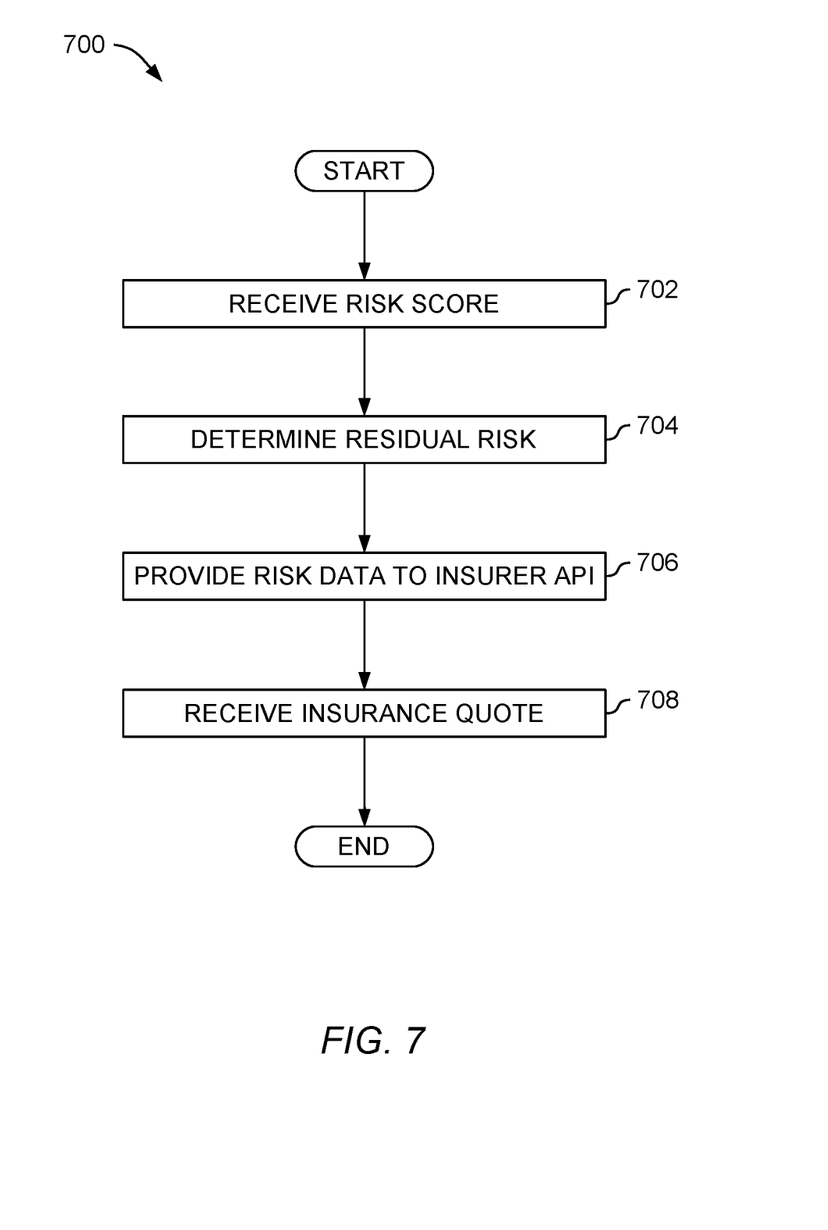
FIG. 7 is a flowchart illustrating confidential determination of a cyber insurance premium using risk data, according to one embodiment.

FIG. 7 is a flowchart 700 illustrating confidential determination of a cyber insurance premium using risk data, according to one embodiment. As discussed above, in an embodiment various insurers (e.g., the insurance providers 102 illustrated in FIG. 1) have proprietary techniques to determine cyber insurance premiums and terms, based on risk. These insurers may be reluctant to share the proprietary techniques with the collaboration system (e.g., the collaboration system 250 illustrated in FIG. 2) for fear that they will be exposed to competitors. As discussed below, multiple techniques can be used to ensure that insurer premium calculations remain confidential.

At block 702, a collaboration system (e.g., the collaboration system 250 illustrated in FIGS. 2-6) receives one or more risk scores (e.g., from compliance and testing experts 110 illustrated in FIG. 1). At block 704, the collaboration system determines residual risk (e.g., using the risk aggregation module 210 and the residual risk calculation module 220 illustrated in FIGS. 2-3).

At block 706, the collaboration system (e.g., the premium calculation module 230 illustrated in FIGS. 2-3) provides the risk data to the insurer API. In one embodiment, the proprietary insurer techniques for calculating premiums are maintained by the various insurers and exposed to the collaboration system through an API. For example, the insurers can provide an API which, when provided the residual risk score and other designated parameters, provides an insurance premium quote. For example, the API can include as parameters both risk scores based on the compliance and testing experts, and other factors requested by the insurer. This allows the proprietary techniques to be maintained by the insurer, without exposure to the collaboration system. At block 708, the collaboration system receives the insurance quote from the insurer, using the API.

Use of an API provided by the insurer is merely one example technique. Alternatively, homomorphic encryption could be used. Homomorphic encryption can allow data to be processed, while the data remains encrypted. For example, homomorphic encryption could be used to allow an insurer to provide an insurance quote without exposing the insurer's proprietary technique: the insurer could provide an encrypted version of its premium calculation function, and the collaboration system could apply and use the function while it remains encrypted. As another alternative, zero-knowledge proof techniques could be used to allow the collaboration system and insurers to exchange risk data and the premium quote, without exposing the insurer's proprietary techniques.

Further, the embodiments described above generally discuss insurers providing cyber insurance quotations and insurance. Alternatively, or in addition, a distributed collection of entities can act as the insurer. For example, instead of an insurance provider, a group of entities could act together to insure a customer. Further, an individual wishing to act as a partial insurer could join the collaboration system and commit to provider a given amount or percentage of cyber insurance. The use of a blockchain network (e.g., the blockchain network 120) or another distributed ledger facilitates this distributed activity by provided for trusted exchange information exchange between the entities.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the collaboration system 250) or related data available in the cloud. For example, the collaboration system 250 could execute on a computing system in the cloud and facilitate a dynamic cyber insurance collaboration system. In such a case, the collaboration system 250 could interact with a distributed ledger maintained at storage locations in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
   retrieving from an electronic distributed ledger a profile describing information technology (IT) infrastructure for an entity;
   providing at least a portion of the profile to a risk evaluator using the electronic distributed ledger;
   retrieving from the electronic distributed ledger a cyber security risk evaluation associated with the profile, wherein the profile is generated based on parsing an Infrastructure as Code (IaC) description of the IT infrastructure;
   receiving from the entity a request for cyber insurance;
   automatically determining cyber insurance parameters for the entity, using a computer processor, and based on the cyber security risk evaluation, wherein the entity acquires cyber insurance based on the determined cyber insurance parameters;
   receiving notification of an available update associated with at least one of software or hardware in the IT infrastructure;
   requesting an updated cyber security risk evaluation for the entity, based on the notification;
   retrieving from the electronic distributed ledger the updated cyber security risk evaluation;
   generating an IT infrastructure update requirements for the entity, based on the updated cyber security risk evaluation;
   providing the IT infrastructure update requirements to the entity; and
   receiving from the entity confirmation that the IT infrastructure update requirements are met, wherein the confirmation that the IT infrastructure update requirements are met is provided automatically by a software agent operating on the IT infrastructure.

2. The method of claim 1, further comprising:
   retrieving from the electronic distributed ledger an updated profile describing an updated IT infrastructure for the entity;
   providing at least a portion of the updated profile to the risk evaluator using the electronic distributed ledger;
   retrieving from the electronic distributed ledger an updated cyber security risk evaluation associated with the updated profile;
   determining updated cyber insurance parameters for the entity based on the updated cyber security risk evaluation; and
   providing to the entity the updated cyber insurance parameters.

3. The method of claim 2, wherein the updated profile is automatically stored in the electronic distributed ledger by a software agent operating on the IT infrastructure.

4. The method of claim 1, wherein the cyber insurance parameters comprise an insurance premium value, the determining cyber insurance parameters for the entity based on the cyber security risk evaluation further comprising:
   providing the cyber security risk evaluation to an insurer of a plurality of insurers; and
   receiving from the insurer the insurance premium value.

5. The method of claim 1, wherein the distributed ledger comprises a blockchain.

6. The method of claim 1, wherein the profile does not identify the entity.

7. The method of claim 1, wherein the determining cyber insurance parameters for the entity based on the cyber security risk evaluation further comprises:
   calculating residual cyber security risk for the entity based on the cyber security risk evaluation and one or more additional parameters.

8. The method of claim 7, wherein the one or more additional parameters comprise at least one of a Quality of Service (QoS) parameter associated with the entity or a data sensitivity parameter associated with the entity.

9. The computer-implemented method of claim 1, wherein the profile comprises an anonymized description of the IT infrastructure that excludes identifying information for the entity, wherein the anonymized description is generated based on parsing the IaC description, and wherein the anonymized description is stored in the electronic distributed ledger.

10. A system, comprising:
    a processor; and
    a memory containing a program that, when executed on the processor, performs an operation, the operation comprising:
       retrieving from an electronic distributed ledger a profile describing information technology (IT) infrastructure for an entity, wherein the profile is generated based on parsing an Infrastructure as Code (IaC) description of the IT infrastructure;
       providing at least a portion of the profile to a risk evaluator using the electronic distributed ledger;

retrieving from the electronic distributed ledger a cyber security risk evaluation associated with the profile;

receiving from the entity a request for cyber insurance;

automatically determining cyber insurance parameters for the entity, based on the cyber security risk evaluation, wherein the entity acquires cyber insurance based on the determined cyber insurance parameters;

receiving notification of an available update associated with at least one of software or hardware in the IT infrastructure;

requesting an updated cyber security risk evaluation for the entity, based on the notification;

retrieving from the electronic distributed ledger the updated cyber security risk evaluation;

generating an IT infrastructure update requirements for the entity, based on the updated cyber security risk evaluation;

providing the IT infrastructure update requirements to the entity; and receiving from the entity confirmation that the IT infrastructure update requirements are met, wherein the confirmation that the IT infrastructure update requirements are met is provided automatically by a software agent operating on the IT infrastructure.

11. The system of claim 10, the operation further comprising:

retrieving from the electronic distributed ledger an updated profile describing an updated IT infrastructure for the entity;

providing at least a portion of the updated profile to the risk evaluator using the electronic distributed ledger;

retrieving from the electronic distributed ledger an updated cyber security risk evaluation associated with the updated profile;

determining updated cyber insurance parameters for the entity based on the updated cyber security risk evaluation; and providing to the entity the updated cyber insurance parameters.

12. The system of claim 10, wherein the cyber insurance parameters comprise an insurance premium value, the determining cyber insurance parameters for the entity based on the cyber security risk evaluation further comprising:

providing the cyber security risk evaluation to an insurer of a plurality of insurers; and receiving from the insurer the insurance premium value.

13. The system of claim 10, wherein the determining cyber insurance parameters for the entity based on the cyber security risk evaluation further comprises:

calculating residual cyber security risk for the entity based on the cyber security risk evaluation and one or more additional parameters.

14. A non-transitory computer program product comprising:

a computer-readable storage medium having computer-readable program code embodied therewith, the computer-readable program code executable by one or more computer processors to perform an operation, the operation comprising:

retrieving from an electronic distributed ledger a profile describing information technology (IT) infrastructure for an entity;

providing at least a portion of the profile to a risk evaluator using the electronic distributed ledger;

retrieving from the electronic distributed ledger a cyber security risk evaluation associated with the profile, wherein the profile is generated based on parsing an Infrastructure as Code (IaC) description of the IT infrastructure;

receiving from the entity a request for cyber insurance;

automatically determining cyber insurance parameters for the entity, based on the cyber security risk evaluation, wherein the entity acquires cyber insurance based on the determined cyber insurance parameters;

receiving notification of an available update associated with at least one of software or hardware in the IT infrastructure;

requesting an updated cyber security risk evaluation for the entity, based on the notification;

retrieving from the electronic distributed ledger the updated cyber security risk evaluation;

generating an IT infrastructure update requirements for the entity, based on the updated cyber security risk evaluation;

providing the IT infrastructure update requirements to the entity; and receiving from the entity confirmation that the IT infrastructure update requirements are met, wherein the confirmation that the IT infrastructure update requirements are met is provided automatically by a software agent operating on the IT infrastructure.

15. The computer program product of claim 14, the operation further comprising:

retrieving from the electronic distributed ledger an updated profile describing an updated IT infrastructure for the entity;

providing at least a portion of the updated profile to the risk evaluator using the electronic distributed ledger;

retrieving from the electronic distributed ledger an updated cyber security risk evaluation associated with the updated profile;

determining updated cyber insurance parameters for the entity based on the updated cyber security risk evaluation; and providing to the entity the updated cyber insurance parameters.

16. The computer program product of claim 14, wherein the determining cyber insurance parameters for the entity based on the cyber security risk evaluation further comprises:

calculating residual cyber security risk for the entity based on the cyber security risk evaluation and one or more additional parameters.

* * * * *